(12) United States Patent
Roy

(10) Patent No.: US 7,366,614 B2
(45) Date of Patent: Apr. 29, 2008

(54) METHODS AND APPARATUS FOR EMERGENCY RIG MONITORING

(76) Inventor: Russell L. Roy, 4011 Brynmawr Dr., Richmond, TX (US) 77489

( * ) Notice: Subject to any disclaimer, the term of this patent is extended or adjusted under 35 U.S.C. 154(b) by 19 days.

(21) Appl. No.: 11/267,045

(22) Filed: Nov. 4, 2005

(65) Prior Publication Data

US 2007/0118289 A1 May 24, 2007

(51) Int. Cl.
*G01W 1/00* (2006.01)
*G01V 9/00* (2006.01)

(52) U.S. Cl. .............................................. 702/3; 702/6
(58) Field of Classification Search .................... 702/2, 702/6, 14, 3, 4, 5
See application file for complete search history.

(56) References Cited

U.S. PATENT DOCUMENTS

| | | | |
|---|---|---|---|
| 4,177,466 A | 12/1979 | Reagan | |
| 4,818,998 A | 4/1989 | Apsell et al. | |
| 4,891,650 A | 1/1990 | Sheffer | |
| 4,908,629 A | 3/1990 | Apsell et al. | |
| 5,055,851 A | 10/1991 | Sheffer | |
| 5,295,180 A | 3/1994 | Vendetti et al. | |
| 5,319,698 A | 6/1994 | Glidewell et al. | |
| 5,504,491 A | 4/1996 | Chapman | |
| 5,654,718 A | 8/1997 | Beason et al. | |
| 5,777,551 A | 7/1998 | Hess | |
| 5,850,180 A | 12/1998 | Hess | |
| 5,936,553 A | 8/1999 | Kabel | |
| 5,978,739 A * | 11/1999 | Stockton ........................ | 702/6 |
| 6,028,514 A * | 2/2000 | Lemelson et al. ..... | 340/539.13 |
| 6,049,273 A | 4/2000 | Hess | |
| 6,076,039 A | 6/2000 | Kabel et al. | |
| 6,181,841 B1 * | 1/2001 | Hodge .......................... | 385/12 |
| 6,212,476 B1 | 4/2001 | Noy et al. | |
| 6,213,401 B1 | 4/2001 | Brown | |
| 6,366,854 B1 * | 4/2002 | Tsuchiya et al. ............. | 701/213 |
| 6,469,641 B1 | 10/2002 | Lash et al. | |
| 6,728,605 B2 | 4/2004 | Lash et al. | |
| 6,933,884 B2 | 8/2005 | Martin et al. | |
| 6,952,181 B2 | 10/2005 | Karr et al. | |
| 2002/0055820 A1 * | 5/2002 | Scannell .......................... | 702/3 |
| 2002/0188522 A1 * | 12/2002 | McCall et al. ................. | 705/26 |
| 2003/0037602 A1 * | 2/2003 | Glasgow et al. ........... | 73/61.41 |

FOREIGN PATENT DOCUMENTS

CA 2186790 9/1996

* cited by examiner

*Primary Examiner*—Donald E McElheny, Jr.
(74) *Attorney, Agent, or Firm*—Patterson & Sheridan, L.L.P.

(57) ABSTRACT

Methods and apparatus for emergency rig monitoring are disclosed herein. The invention generally relates to methods and apparatus for monitoring an offshore rig. The rig monitoring systems and methods of use can relay information regarding the rig such as location, attitude (e.g. tilt, oscillation), and local water and weather conditions. The rig monitoring systems and methods can also facilitate emergency communication for rig personnel. Access to the information can be remotely initiated and the systems can be configured to automatically respond to such initiation. The rig monitoring systems are equipped with a self-sustainable power supply for operation under conditions where external power sources are unavailable. Such rig monitoring systems and methods are particularly useful on rigs that are located in waters subject to rapid and severe changes in local weather such as storms.

22 Claims, 6 Drawing Sheets

METHODS AND APPARATUS FOR EMERGENCY RIG MONITORING

FIELD OF THE INVENTION

Embodiments of the invention generally relate to methods and apparatus for monitoring offshore structures and vessels. More particularly, the invention relates to methods and apparatus for monitoring offshore hydrocarbon rigs and communicating rig data to a location remote from the rig.

BACKGROUND OF THE INVENTION

Exploration for and production of hydrocarbon based energy deposits has often required that people and equipment operate in challenging and potentially hazardous environments around the world. As hydrocarbon deposits become more difficult to find, more exploration and production activities are occurring in bodies of water including oceans and seas. Offshore hydrocarbon exploration and production requires that expensive rigs or vessels be semi-permanently located in bodies of water. Many bodies of water are subject to dramatic and sudden changes in weather. More notorious examples of such changes include storms such as tropical storms, typhoons, and hurricanes.

Offshore rigs are usually supported structurally from the sea floor (e.g. jack-up rigs and island rigs) or are supported by buoyant structures (e.g. semi-submersibles, spars, ships). Some hybrid designs exist. Most rigs are moored to the sea floor by anchors and mooring lines in order to resist lateral rig movement. Such rigs are usually manned either around the clock or intermittently in order to monitor and maintain rig systems and operations.

When a storm approaches an offshore rig the safety of the rig crew becomes a primary issue. The condition and location of the rig are also at issue. As a storm approaches the rig crew is evacuated either by boat or helicopter and the rig is left unmanned or partially unmanned. Events that occur as the storm draws near to and impacts the rig go largely unmonitored. If standard rig communications go down before an evacuation can occur, the situation for the rig crew becomes critical. If the rig is evacuated before a storm arrives then the condition and location of the rig become unknown until some time after the storm has passed.

If the storm has damaged critical rig systems including mooring lines, such damage can not be detected until after the storm has passed. In many cases a rig that has been hit or almost hit by a storm can not even be readily located because the mooring lines have been broken and the rig has drifted. Rigs have been blown off location by hundreds of miles in some instances. Such drifting rigs create a hazard separate from that of the storm in that the rig may actually impact another vessel or structure. An ability to locate a drifting rig and advance warning of the status and course of such a rig is needed. So that design insight may be gained for the future, an ability to analyze events leading up to the loss of a rig at sea is also needed.

Methods for tracking things such as automobiles, boats and airplanes have been devised. Devices such as Lo-Jack (registered) have been marketed for tracking stolen automobiles. When activated, that device sends a radio signal that can be received by a tracking device. Such a device does not provide exact automobile location; rather it provides location information relative to the tracking receiver. The Lo-Jack device is described in U.S. Pat. Nos. 4,908,629, 4,818,998, and 4,177,466.

A system and method for monitoring a boat are subjects of U.S. Pat. No. 6,469,641. That patent discloses tracking a stolen boat and monitoring certain security and operational parameters related to the boat such as unauthorized entry, bilge pump function, battery charge, and boat location. Such a system for monitoring of a boat does not address parameters relevant to a rig or its environment.

While there are many different types of tracking and monitoring systems including some for marine vessels, none address issues and parameters that are of specific interest regarding an offshore hydrocarbon rig.

Accordingly, there is a need for an invention that facilitates the monitoring of parameters related to an offshore rig and the communication of information related to the offshore rig to a remote location where concerned persons are able to access such information. Such an invention should preferably operate in inclement weather and through periods of rig power interruption.

SUMMARY OF THE INVENTION

The invention generally relates to methods and apparatus for monitoring an offshore rig. The rig monitoring systems and methods of use can relay information regarding the rig such as location, attitude (e.g. tilt, oscillation), and local water and weather conditions. The rig monitoring systems and methods can also facilitate emergency communication for rig personnel. Access to the information can be remotely initiated and the systems can be configured to automatically respond to such initiation. The rig monitoring systems are equipped with a self-sustainable power supply for operation under conditions where external power sources are unavailable. Such rig monitoring systems and methods are particularly useful on rigs that are located in waters subject to rapid and severe changes in local weather such as storms.

A method for preparing a rig for adverse climatic conditions is included herein and comprises:
  receiving notification of an approaching adverse climatic condition;
  ceasing rig activities related to at least one of hydrocarbon exploration and production;
  securing equipment on the rig;
  evacuating the rig;
  monitoring the adverse climatic condition;
  monitoring at least one rig parameter; and
  communicating data related to the rig parameter to a remote location.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENT

One embodiment hereof comprises a method for remotely monitoring a parameter on at least one offshore hydrocarbon rig. Hydrocarbon rigs contemplated herein include drilling rigs, production platforms, processing terminals, floating storage vessels, pipeline switching or access terminals and other facilities positioned offshore for use in the hydrocarbon production and delivery process. Such hydrocarbon rigs mat be jacked up, semi-submersible, or floating and may be anchored to the sea floor with mooring lines or dynamically positioned or any suitable combination thereof.

Figure 1:
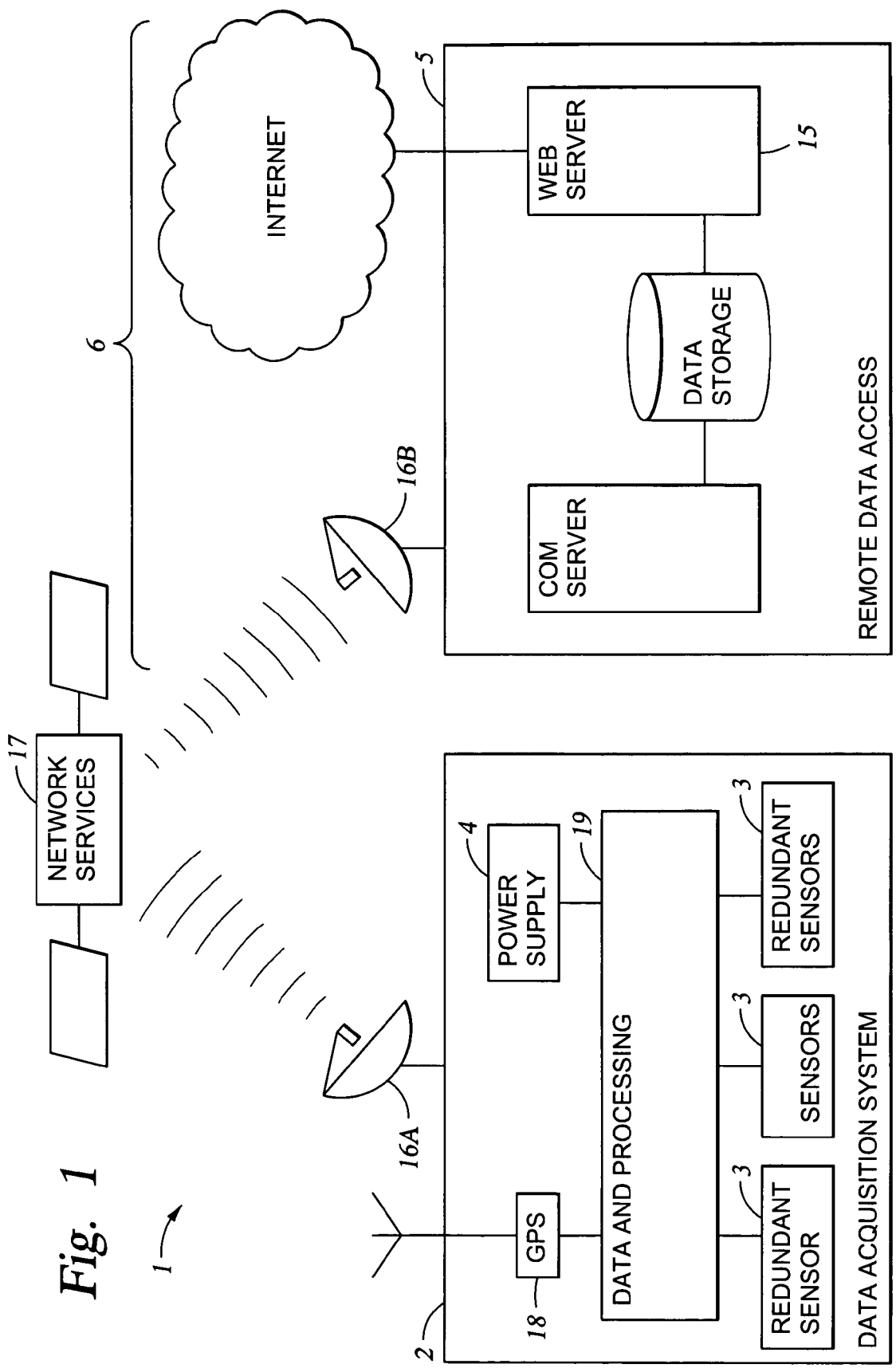
FIG. 1 shows a schematic representation of a rig monitoring system (1).

Referring to FIG. 1 the embodiment includes providing a rig monitoring system (1) comprising at least one data acquisition system (2) having at least one parameter sensor (3) and at least one power supply (4) configured to operate independently of an external power source. Further provided is at least one remote data access member (5). The parameter sensor (3) is positioned so that it monitors at least one parameter related to the offshore hydrocarbon rig. Data is acquired from the parameter sensor (3) and then communicated to a remote location having a remote access member (5).

So that the data acquisition system (2) may operate in the event of other power outage, the power supply (4) comprises a self-sustaining energy source such as a capacitor, solar panel, fuel cell, battery or combination thereof or any other suitable source or combination of sources. In an embodiment including a battery, an eight day battery pack is preferred. The eight day minimum energy source life may result from a suitable combination of a chosen energy source with any or all of operating bandwidth, low power consumption system components, programmed system sleep modes, and preset sample rate. Regardless of the self-sustaining energy source used, the design of the data acquisition system (2) is such that relatively low power levels are required for operation. During normal operation of external power supplies such as rig power, the power supply (4) may be charged.

Figure 5:
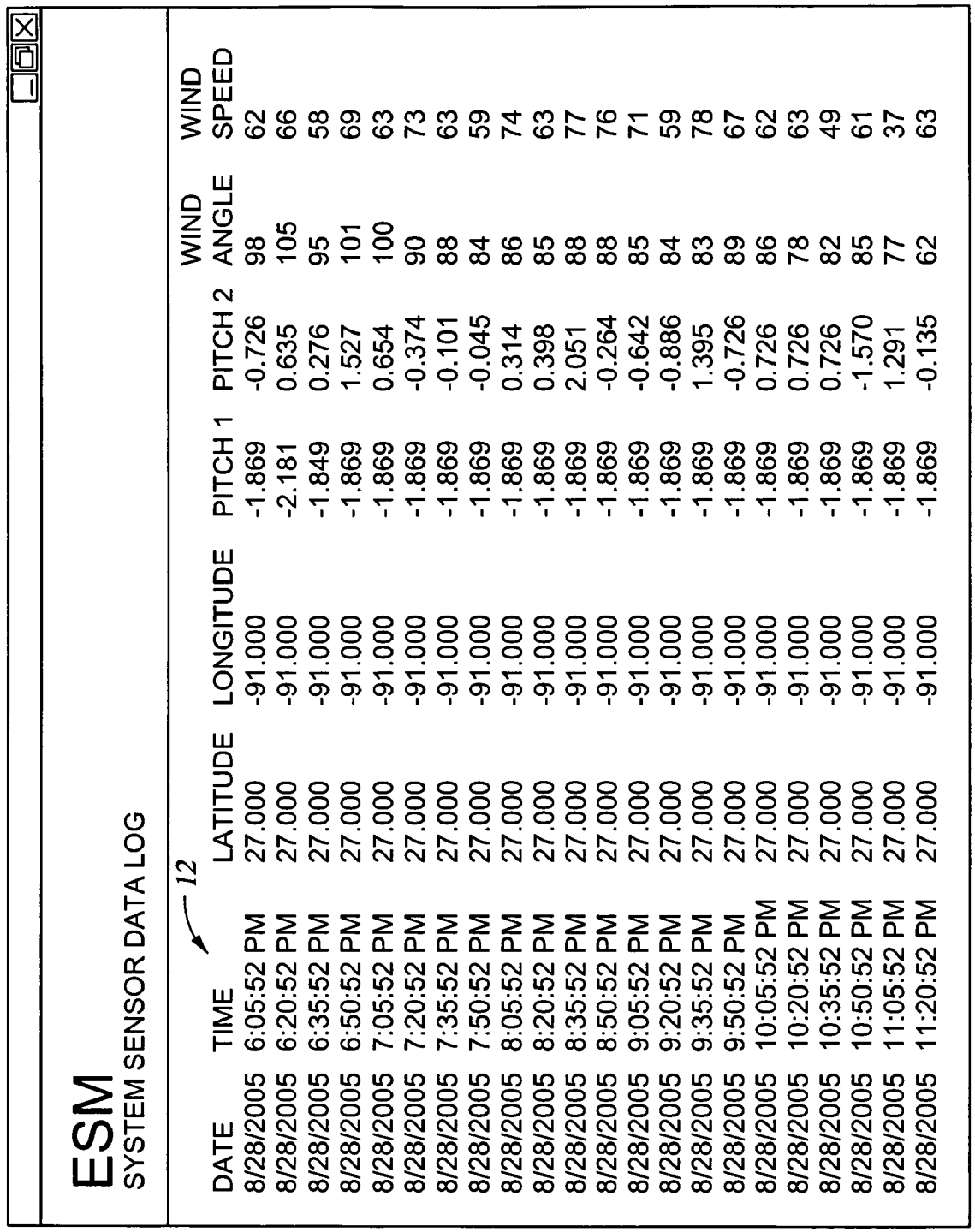
FIG. 5 shows an example data set in tabular form.

Monitored parameters are those relevant to the operation, condition and/or location of the rig during times of evacuation, partial evacuation, or failure of normal rig communication systems and may include longitude and latitude of the rig, roll, pitch of the rig, wave height and frequency, wind speed, wind direction, mooring line tension, rig generator data and any other desirable parameter or any combination thereof. A sample data table is shown in FIG. 5. The data acquisition system (2) may support a plurality of parameter sensors (3). The plural sensors (3) may be redundant so that data may be verified or they may measure multiple parameters or they may do both. Sensors (3) may comprise inclinometers (tilt sensors), anemometers, current meters, thermometers, pressure sensors, load cells or any other suitable sensors (3) or combinations thereof.

Figure 2:
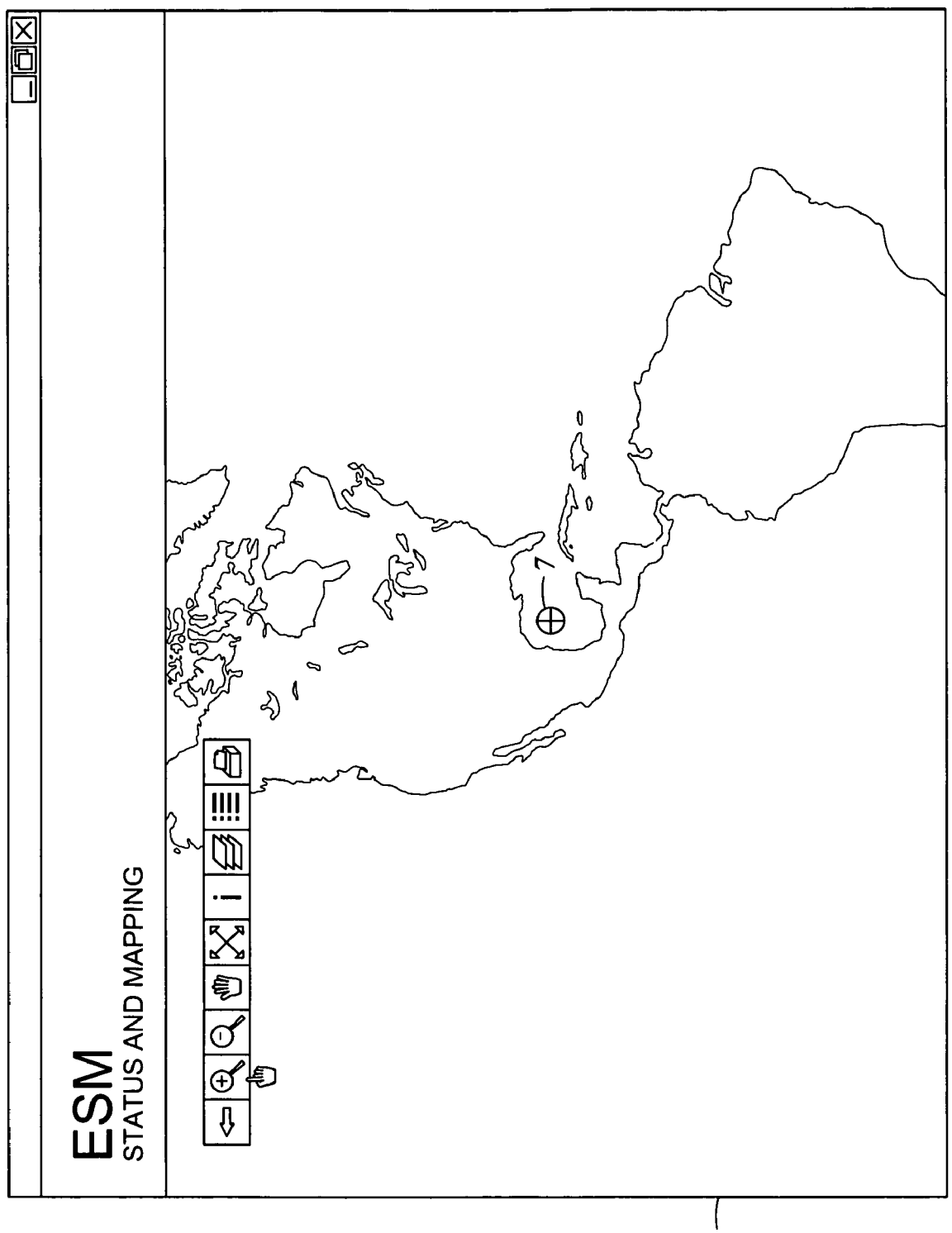
FIG. 2 shows a rig icon (7) plotted on a geographic map (8).
Figure 3:
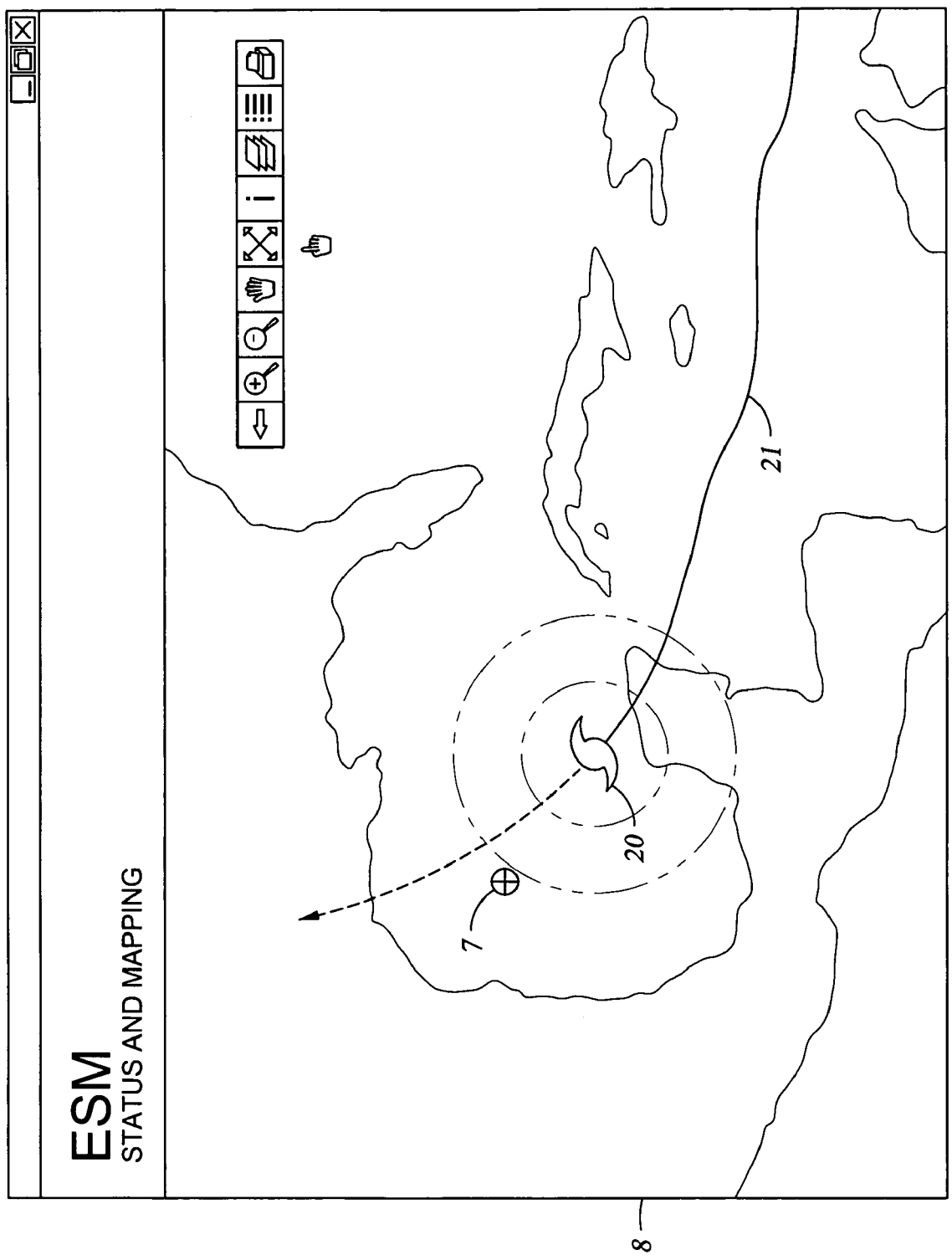
FIG. 3 shows a zoom in of map (8) focusing on the rig icon (7) and including a storm (20) and storm track (21).
Figure 4:
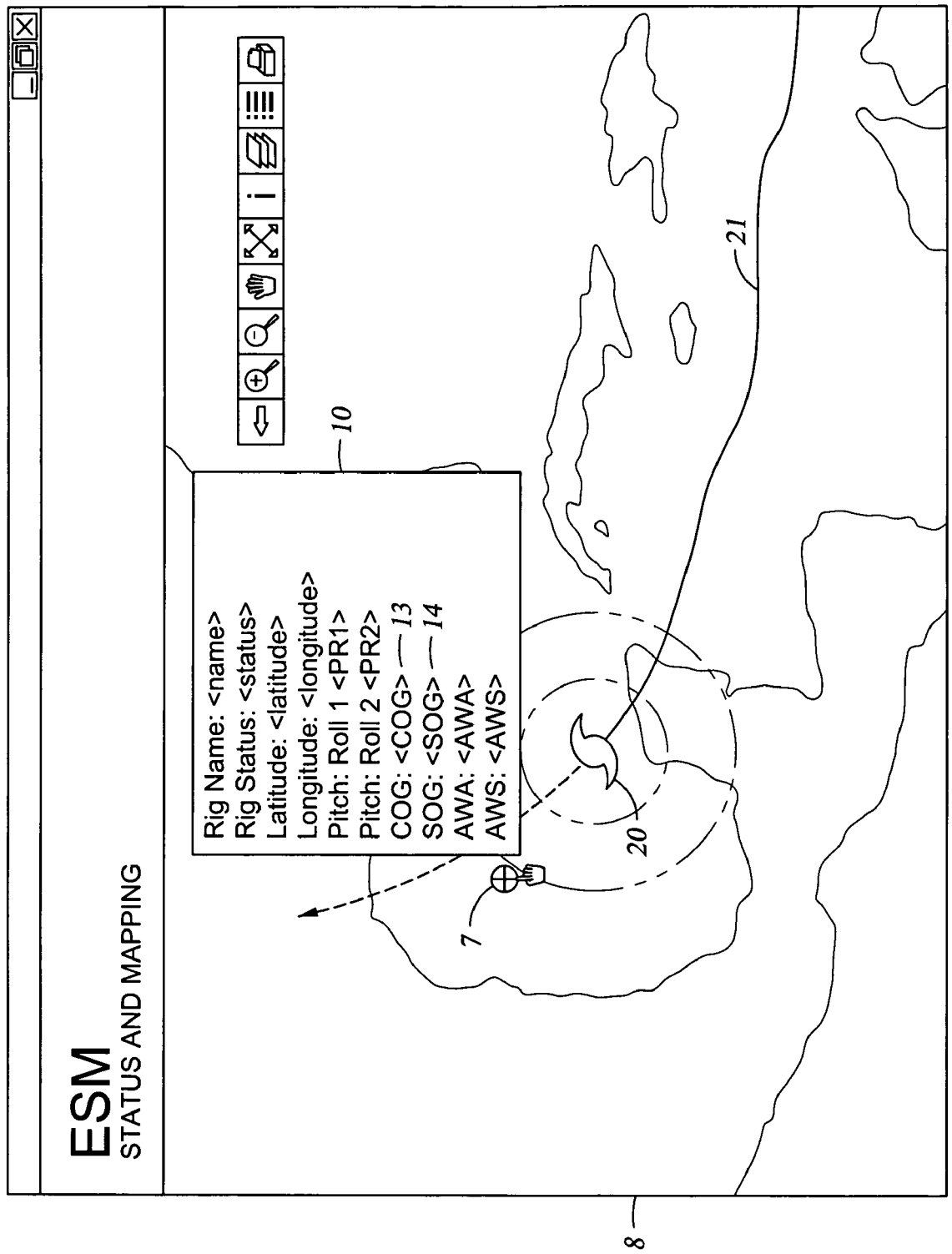
FIG. 4 shows an embedded data set (10) associated with the user interactive rig icon (7) plotted on the map (8).

Acquired data may be stored in a memory or other signal bearing medium of the data acquisition system (2) or of a remote location (6) or both. In one alternative at least one stored data is time stamped with a date and/or time corresponding to the time at which the data was generated. Examples of data that have been date and time stamped (12) are shown in FIG. 5. At least a portion of such data may be used either remotely or by a processor of the data acquisition system (2) to determine secondary data. Such secondary data comprises information that is relevant to the condition and/or location of the rig and in the event that the rig is moving may include rig speed and rig course. Examples of secondary data are shown in FIGS. 2, 3, and 4. FIG. 2 shows a rig location icon (7) plotted relative to a geographical map (8). Such a derived plot exemplifies some secondary data. FIG. 4 shows a geographic location plot or map (8) with a data set (10) linked to a user interactive rig icon (7). Examples of secondary data included in the data set (10) are Course Over Ground ("COG") (13) and Speed Over Ground ("SOG") (14). Optionally the data set of FIG. 5 may be linked to an interactive feature such as a rig icon (7). Optionally any data set may be linked to any interactive feature. Other interactive features may include a storm icon (20) and a storm track (21) shown in FIG. 3. Storm characteristic and tracking data may be linked to a storm icon (20) or a storm course plot icon (21) and displayed when the icon is activated. Storm data may be integrated with rig data to derive storm distance from and projected time until arrival at the rig. Such secondary data may also include a rig status summary indicator such as a warning. The warning indicates that a certain parameter has reached a critical value. An example of a parameter that may merit a warning is mooring line tension. A mooring line load cell (an example of a parameter sensor (3)) is disposed adjacent a mooring line so that it may measure line tension. When the line tension reaches a critical value such as yield point or actual failure a warning may be generated. Other critical values that may merit a warning include rig course collision (with another object) predicted, rig tilt exceeds acceptable angle, wind speed in excess of rig design rating, and wave height in excess of rig design rating. Such a warning may be visible or audible or both and is detectable by a user at the remote access member.

The remote data access member (5) is used from a location remote to the rig to access data acquired by the monitoring system (1). The member (5) may be an internet server, personal computing device, or data storage system located onshore or on another offshore facility or vessel and includes or is connected to a wireless communication system. The remote data access member (5) may comprise a node (15) in a network such as an internet. The remote data access member can selectively or continuously be communicatively connected to the rig monitoring system (1) preferably via a communication port (16). In one alternative the remote data access member (5) is a personal computing device such as a laptop computer. In such an alternative the personal computing device is used to access the communication port (16*b*) by direct analog phone line dial up. That phone line is then connected to the communication port (16*a*) and the data acquisition system (2) and data is automatically sent to the personal computing device in response to the call. In another alternative the remote data access member (5) comprises a plurality of remote data access members thereby allowing multiple to users to access data from one or more rigs from multiple remote locations (6).

The data acquisition system (2) has a communication port (16*a*) wherein the port (16*a*) is configured to send and receive signals to and from the remote location (5). In one alternative the port (16*a*) is co-located with the rig and is part of the data acquisition system (2) or is at a fixed location relative to the data acquisition system (2). The communication port (16*a*) may be configured to send signals to and receive signals from multiple remote locations. In one alternative the port (16*a*) may only send signals at a predetermined frequency or continuously.

In another alternative the port (16a) is configured to automatically respond to a query signal sent from a remote location port (16b) by receiving the query signal, engaging a send mode and sending acquired data to the remote location (6). In that alternative, a signal from the remote location is received at the communication port (16a). In response to the signal, the communication port (16a) automatically engages a send type communication link with the remote location (6) and begins sending acquired rig parameter data.

The port (16) may comprise a wireless modem having relatively low power requirements or any other suitable modem or wireless communication device. In one alternative the port (16) is configured to operate over a narrow bandwidth to minimize power requirements. Communication between the port (16a) and the remote location may include changing a trajectory of at least a portion of a signal using a satellite (17). Such a satellite (17) may comprise a Low Earth Orbit Satellite ("LEO"). Use of a LEO to facilitate communication between the port (16a) and the remote location (6) is particularly advantageous in inclement weather because the relatively short distance from the earth to the LEO satellite (17) minimizes atmospheric attenuation of the communication signals. An example of a port device suitable for use with a LEO satellite is a Globalstar satellite modem made by Qualcomm. In one alternative, the communication port (16) is an internet port and posts acquired data on an internet site. Optionally, the internet site may be accessible only by authorized users having a pass code. In another alternative the communication port (16) communicates using a cellular network. In yet another alternative, facilitation of communication between the port (16a) and the remote location (6) comprises at least in part a wide area network and/or a local area network using cables or wireless mechanisms. Communication between the remote location (6) and the port (16a) may be facilitated by any of the foregoing or by any suitable combinations thereof.

In one aspect, the rig monitoring system (1) includes a rig position signal receiver (18) for receiving signals indicative of a geographic location of the rig or of a location of the rig relative to another known location or both. In one alternative the signal receiver (18) may be a Global Positioning Satellite ("GPS") system of the data acquisition system (2). In another alternative the signal receiver (18) may be a cellular device. The signal receiver (18) may also receive any other suitable electromagnetic spectral wave forms. The receiver (18) may receive signals directly indicative of the geographic location of the rig or the signals may require processing by a processor of the signal receiver (18) to derive the rig location. The receiver (18) may also receive signals indicative of change and/or rate of change in geographic location of the rig. A receiver processor (19) may also be used to derive change and/or rate of change. The signal receiver (18) receives signals from an external source such as a GPS system and communicates rig position data indicative of location (e.g. longitude and latitude), speed, and course or any combination thereof to a remote location (6).

In one aspect, the rig monitoring system (1) is configured to provide a map (8) of a region of the earth and plot an icon showing the location of the rig (7) on the map. Optionally, the map (8) has at least one user interactive feature such as zoom (in and/or out), embedded data sets (10) associated with a rig icon (7) or other features of the map. FIGS. 3 and 4 show zoom in perspectives of FIG. 2.

Figure 6:
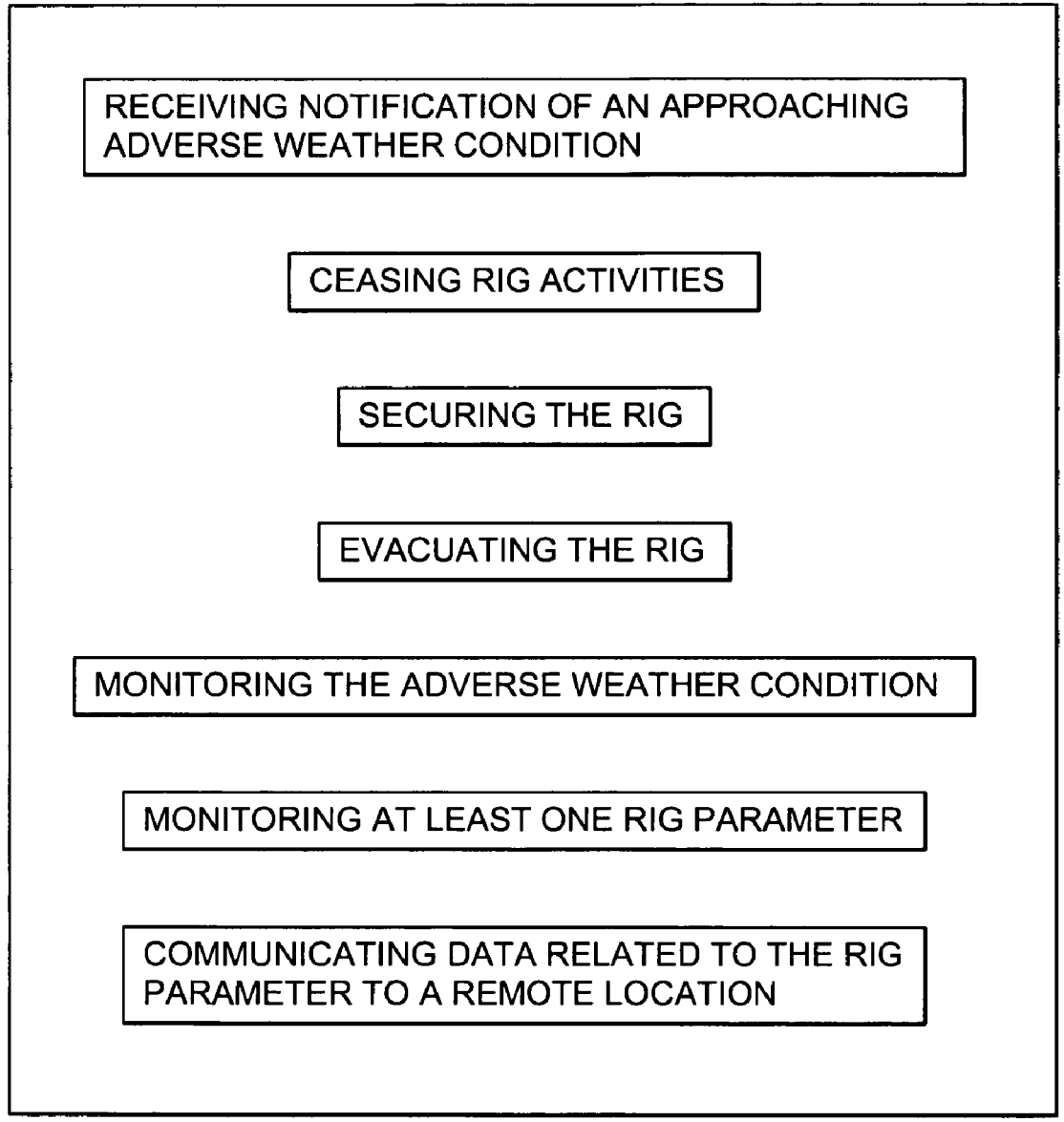
FIG. 6 shows a method for at least temporarily ceasing rig operations.

As shown in FIG. 6 another aspect provides a method for at least temporarily ceasing normal offshore rig operations comprising use of a rig monitoring system. A rig operator receives notification of an approaching adverse weather condition and ceases rig activities related to at least one of hydrocarbon exploration and production. The operator then secures equipment on the rig and evacuates at least some of the rig personnel. The adverse weather condition is monitored generally and at least one rig parameter is monitored using the rig monitoring system to acquire parameter data and communicate the parameter data to a remote location by wireless transmission.

Some features of certain embodiments are exemplified as follows:

E1. A method for remotely monitoring a parameter on at least one offshore hydrocarbon rig comprising:
providing at least one data acquisition system having at least one parameter sensor and at least one power supply configured to operate independently of an external source;
providing at least one remote data access member;
positioning the parameter sensor for monitoring at least one parameter related to the offshore hydrocarbon rig;
acquiring data from the parameter sensor; and
communicating the data to the remote data access member.

E2. The method of E1. wherein the power supply comprises a battery.

E3. The method of E1. wherein the parameter is at least one of longitude, latitude, roll, pitch, wave height, wave direction, wave frequency, water current, wind speed, wind direction, and mooring line tension.

E4. The method of E1. wherein the data acquisition system comprises a plurality of parameter sensors.

E5. The method of E1. wherein the data is displayed in real time on at least one of the data acquisition system and the remote data access member.

E6. The method of E1. wherein the sensor is an inclinometer.

E7. The method of E1. wherein the sensor is an anemometer.

E8. The method of E1. wherein the sensor comprises a plurality of sensors.

E9. The method of E8. wherein the sensors are at least in part redundant.

E10. The method of E1. further comprising storing the acquired data.

E11. The method of E10. wherein at least one stored data is time stamped.

E12. The method of E1. further comprising using at least a portion of the data to determine secondary data.

E13. The method of E1. wherein the data is communicated using a communication port.

E14. The method of E13. wherein the communication port is a Low Earth Orbit satellite modem.

E15. The method of E12. wherein the secondary data comprises rig speed.

E16. The method of E12. wherein the secondary data comprises rig course.

E17. The method of E12. wherein the secondary data comprises a rig status summary indicator.

E18. The method of E17. wherein the rig status summary indicator is a warning.

E19. A method for remotely monitoring a location of a hydrocarbon rig comprising:
providing a data acquisition system having at least one signal receiver and a power supply configured to operate independently of an external source;

providing a remote data access terminal;
locating the signal receiver in a fixed position relative to the hydrocarbon rig;
receiving at least one signal related to the relative position of the signal receiver;
using the signal to determine a geographical location of the hydrocarbon rig; and
communicating at least one of the signal and the location to the remote data access terminal.

E20. The method of E19. wherein the signal is a GPS signal.

E21. The method of E19. further comprising providing a map of a region of the earth and plotting a location of the rig on the map.

E22. The method of E21. wherein the map has at least one user interactive feature.

E23. The method of E22. wherein the user interactive feature comprises zoom.

E24. The method of E22. wherein the interactive feature comprises a data display associated with a feature of the map.

E25. The method of E22. wherein the feature of the map is a rig icon.

E26. The method of E19. wherein the fixed position is on the rig.

E27. The method of E19. wherein the rig is offshore.

E28. The method of E19. wherein communicating further comprises accessing a network.

E29. The method of E28. wherein the network includes at least one satellite

E30. A method for retrieving data from a hydrocarbon rig comprising:
providing a rig monitoring system for monitoring at least one parameter of the hydrocarbon rig and having a communication port wherein the port is configured to receive a signal from a remote location;
monitoring at least one rig parameter with the rig monitoring system;
sending a signal from a remote location;
receiving the signal at the communication port;
establishing a communication link in response to the signal; and
automatically transmitting data corresponding to the at least one rig parameter.

E31. The method of E30. further comprising changing a trajectory of at least a portion of the signal using a satellite.

E32. The method of E30. wherein the communication port is a modem.

E33. The method of E32. wherein the modem is a Low Earth Orbit satellite modem.

E34. The method of E30. wherein the communication port is an internet port.

E35. The method of E30. wherein the signal is a cellular signal.

E36. The method of E30. wherein the communication port communicates with a network.

E37. The method of E36. wherein the network includes an internet.

E38. The method of E36. wherein the network includes a wide area network.

E39. The method of E36. wherein the network includes a local area network.

E40. The method of E30. wherein the communication port comprises a low profile antenna.

E41. The method of E30. wherein the hydrocarbon rig is an offshore rig.

E42. The method of E30. wherein the hydrocarbon rig comprises a plurality of hydrocarbon rigs.

E43. The method of E30. wherein the remote location is a land based location.

E44. The method of E30. wherein the remote location comprises a plurality of remote locations E45. The method of E30. wherein the remote location is an internet site.

E46. The method of E45. wherein the internet site includes controlled access.

E47. The method of E30. wherein the communication port is battery operated.

E48. The method of E30. wherein the rig parameter is at least one of location, roll, pitch, wave height, wind speed, wind direction, and mooring line tension E49. A method for ceasing offshore rig operations comprising:
receiving notification of an approaching adverse weather condition;
ceasing rig activities related to at least one of hydrocarbon exploration and production;
securing equipment on the rig;
evacuating the rig;
monitoring the adverse weather condition;
monitoring at least one rig parameter; and
communicating data related to the rig parameter to a remote location.

E50. The method of E49. wherein the data is at least partially communicated using a wireless system.

E51. The method of E50. wherein the wireless system comprises a satellite communication system.

E52. The method of E49. wherein the adverse weather condition is one of a tropical storm and hurricane.

E53. The method of E49. wherein the data is at least partially communicated using an analog phone line.

E54. A system for emergency monitoring of at least one offshore hydrocarbon facility comprising;
at least one power supply configured to operate independently of an external source;
at least one sensor for monitoring at least one parameter related to the facility;
at least one relative position signal receiver;
at least one wireless communication port for communicating data related to the parameter;
at least one remote receiver for receiving the data.

While the foregoing is directed to embodiments of the present invention, other and further embodiments of the invention may be devised without departing from the basic scope thereof, and the scope thereof is determined by the claims that follow.

The invention claimed is:

1. A method for remotely monitoring a parameter on at least one offshore hydrocarbon rig comprising:
providing at least one data acquisition system including at least one parameter sensor and at least one power supply configured to operate independently of an external source;
providing at least one remote data access member;
positioning the parameter sensor for monitoring at least one parameter related to the offshore hydrocarbon rig;
acquiring data relating to at least one of a wave height, wave direction, wave frequency, rig pitch, rig roll, and rig mooring line tension from the parameter sensor; and
communicating the data to the remote data access member.

2. The method of claim 1, wherein the power supply comprises a battery.

3. The method of claim 1, further including acquiring data relating to at least one of longitude, latitude, water current, wind speed, and wind direction.

4. The method of claim 1, wherein the data is displayed in real time on at least one of the data acquisition system and the remote data access member.

5. The method of claim 1, wherein the sensor is at least one of an inclinometer, anemometer, current meter, thermometer, pressure sensor, or load cell.

6. The method of claim 1, wherein the sensor comprises a plurality of sensors.

7. The method of claim 6, wherein at least two of the sensors monitor the same parameter.

8. The method of claim 1, further comprising storing and time stamping the acquired data.

9. The method of claim 8, further comprising using at least a portion of the data to determine secondary data.

10. The method of claim 9, wherein the secondary data comprises rig speed.

11. The method of claim 9, wherein the secondary data comprises rig course history data.

12. A method for ceasing offshore rig operations comprising:
   receiving notification of an approaching adverse weather condition;
   ceasing rig activities related to at least one of hydrocarbon exploration and production;
   securing equipment on the rig;
   evacuating the rig;
   activating an automated rig monitoring system;
   monitoring the adverse weather condition;
   monitoring at least one rig parameter related to the adverse weather condition; and
   communicating data related to the rig parameter from the rig monitoring system to a remote location.

13. The method of claim 12, wherein the data is at least partially communicated using a satellite communication system.

14. The method of claim 12, wherein the adverse weather condition is one of a tropical storm and hurricane and at least a portion of the data is related to rig location.

15. The method of claim 4, wherein the remote data access member is one of at least an Internet server, personal computing device, or data storage system.

16. The method of claim 11 further comprising graphically representing the secondary data relative to a map.

17. The method of claim 16, wherein the map includes the Gulf of Mexico.

18. The method of claim 16, wherein the secondary data comprises a rig status summary indicator and further comprising selectively displaying the rig status summary.

19. The method of claim 18, wherein the rig status summary indicator includes a warning that the at least one parameter has reached a predetermined limit.

20. The method of claim 12, wherein the parameter is one of at least wave height, wave direction, wave frequency, rig pitch, rig roll, and rig mooring line tension.

21. The method of claim 19 wherein the rig status summary indicator is an interactive user interface icon.

22. The method of claim 12, wherein the remote location comprises an Internet site.

* * * * *

UNITED STATES PATENT AND TRADEMARK OFFICE
Certificate

Patent No. 7,366,614 B2                                                                              Patented: April 29, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Russell L. Roy, Richmond, TX (US); and Robert Sanders, Kingwood, TX (US).

Signed and Sealed this Twenty-third Day of September 2008.

<div align="right">

ELISEO RAMOS-FELICIANO
*Supervisory Patent Examiner*
Art Unit 2857

</div>